(12) United States Patent
Gollakota et al.

(10) Patent No.: US 10,383,126 B2
(45) Date of Patent: Aug. 13, 2019

(54) POWER TRANSMISSION USING WIRELESS COMMUNICATION SIGNALS

(71) Applicant: University of Washington, Seattle, WA (US)

(72) Inventors: Shyamnath Gollakota, Seattle, WA (US); Vamsi Talla, Seattle, WA (US); Bryce Kellogg, Seattle, WA (US); Ben Ransford, Seattle, WA (US); Saman Naderiparizi, Seattle, WA (US); Joshua R. Smith, Seattle, WA (US)

(73) Assignee: University of Washington, Seattle, WA (US)

( * ) Notice: Subject to any disclaimer, the term of this patent is extended or adjusted under 35 U.S.C. 154(b) by 29 days.

(21) Appl. No.: 15/508,873

(22) PCT Filed: Sep. 4, 2015

(86) PCT No.: PCT/US2015/048630
§ 371 (c)(1),
(2) Date: Mar. 3, 2017

(87) PCT Pub. No.: WO2016/037100
PCT Pub. Date: Mar. 10, 2016

(65) Prior Publication Data
US 2017/0208597 A1 Jul. 20, 2017

Related U.S. Application Data

(60) Provisional application No. 62/046,818, filed on Sep. 5, 2014, provisional application No. 62/111,567, filed
(Continued)

(51) Int. Cl.
*H04L 12/28* (2006.01)
*H04W 72/04* (2009.01)
(Continued)

(52) U.S. Cl.
CPC ......... *H04W 72/0473* (2013.01); *H02J 7/025* (2013.01); *H02J 50/20* (2016.02);
(Continued)

(58) Field of Classification Search
CPC ..................................................... H04L 12/50
(Continued)

(56) References Cited

U.S. PATENT DOCUMENTS

2005/0152292 A1 7/2005 McDonald et al.
2009/0058361 A1 3/2009 John
(Continued)

FOREIGN PATENT DOCUMENTS

KR 20120134032 12/2012

OTHER PUBLICATIONS

International Search Report and Written Opinion received for PCT/US2015/048630 dated Dec. 10, 2015.
(Continued)

*Primary Examiner* — Dang T Ton
(74) *Attorney, Agent, or Firm* — Dorsey & Whitney LLP

(57) ABSTRACT

Examples described herein include wireless transmitters configured for power transmission. Example wireless transmitters may insert power packets into wireless communications such that power harvesting circuitry may harvest sufficiently continuous power from the wireless communication signals. Example power harvesting circuitry is configured to harvest power across multiple wireless communication channels. Example chargers are described which may harvest power from wireless communication signals (e.g. Wi-Fi signals).

14 Claims, 4 Drawing Sheets

Related U.S. Application Data on Feb. 3, 2015, provisional application No. 62/185,332, filed on Jun. 26, 2015.

(51) Int. Cl.

| | |
|---|---|
| H04L 12/10 | (2006.01) |
| H04W 28/02 | (2009.01) |
| H02J 50/20 | (2016.01) |
| H02J 7/02 | (2016.01) |
| H04W 24/08 | (2009.01) |
| H02J 50/80 | (2016.01) |
| H04L 12/863 | (2013.01) |
| H04W 84/12 | (2009.01) |

(52) U.S. Cl.
CPC .............. *H02J 50/80* (2016.02); *H04L 12/10* (2013.01); *H04W 24/08* (2013.01); *H04W 28/0221* (2013.01); *H04L 47/6255* (2013.01); *H04W 84/12* (2013.01)

(58) Field of Classification Search
USPC .......................................................... 370/329
See application file for complete search history.

(56) References Cited

U.S. PATENT DOCUMENTS

| | | | |
|---|---|---|---|
| 2011/0156658 A1 | 6/2011 | Schubert | |
| 2011/0218014 A1 | 9/2011 | Abu-Qahouq | |
| 2012/0309453 A1 | 12/2012 | Maguire | |
| 2013/0035046 A1 | 2/2013 | Hirabayashi | |
| 2013/0127410 A1 | 5/2013 | Park et al. | |
| 2013/0234536 A1 | 9/2013 | Chemishkian et al. | |
| 2013/0343398 A1 | 12/2013 | Sarca | |
| 2014/0159651 A1 | 6/2014 | Von Novak et al. | |
| 2017/0366433 A1* | 12/2017 | Raleigh | H04W 4/24 |

OTHER PUBLICATIONS

Extended Search Report dated Apr. 4, 2018 for European Application No. 15837653.3.

Amazon, Alexa—Top Sites in United States (Jan. 13, 2015). http://www.alexa.com/topsites/countries/US.

Bharadia, et al., "Full Duplex MIMO Radios", Proceedings of the 11th USENIX Symposium on Networked Systems Design and Implementation, Apr. 2014, pp. 359-372.

Coilcraft, "0402HP Series Inductors" (Oct. 2018) http://www.coilcraft.com/pdfs/0402hp.pdf.

Covic, et al., "Inductive power transfer", Proceedings of the IEEE, vol. 101, No. 6, Jun. 2013, pp. 1276-1289.

Curty, et al., "Remotely Powered Addressable UHF RFID Integrated System", IEEE Journal of Solid-State Circuits, vol. 40(11), pp. 2193-2202, Nov. 2005.

Energous, "Wireless Charging 2.0", last accessed Oct. 2018, http://www.energous.com/overview/.

Ensworth, et al., "Waveform-Aware Ambient RF Energy Harvesting", In RFID (IEEE RFID), 2014 IEEE International Conference on, pp. 67-73, Apr. 2014.

Fano, "Theoretical Limitations on the Broadband Matching Of Arbitrary Impedances", Journal of the Franklin Institute, 249(1), pp. 57-83, Jan. 1950.

Gao, et al., "2.4GHz Energy Harvesting for Wireless Sensor Network", 2011 IEEE Topical Conference on Wireless Sensors and Sensor Networks, pp. 57-60, Mar. 2011.

Gollakota, et al., "Secure in-band wireless pairing". In USENIX Security, pp. 1-16, Aug. 2011.

Gudan, et al., "A 2.4GHz Ambient RF Energy Harvesting System with—20dBm Minimum Input Power and NiMH Battery Storage", 2014 IEEE RFID Technology and Applications Conference, pp. 7-12, Sep. 2014.

Gudan, et al., "Ultra-low power 2.4ghz rf energy harvesting and storage system with—25dbm sensitivity" In IEEE RFID, pp. 40-46, Apr. 2015.

Hagerty, et al., "Recycling ambient microwave energy with broadband rectenna arrays", IEEE Transactions on Microwave Theory and Techniques, vol. 52, No. 3, pp. 1014-1024, Mar. 2004.

Hawkes, et al., "A microwave metamaterial with integrated power harvesting functionality", Applied Physics Letters, Oct. 2013.

Hong, et al., "Picasso: Flexible RF and Spectrum Slicing", SIGCOMM, Aug. 2012, pp. 37-48.

Jadidian, et al., "Magnetic mimo: How to charge your phone in your pocket", MOBICOM, pp. 495-506, Sep. 2014.

Kawahara, et al., "Power harvesting from microwave oven electromagnetic leakage", Proceedings of the 2013 ACM International Joint Conference on Pervasive and Ubiquitous Computing, Sep. 2013, pp. 373-382.

Kawahara, et al., "SenSprout: inkjet-printed soil moisture and leaf wetness sensor", Proceedings of the 2012 ACM Conference on Ubiquitous Computing, Sep. 2012, pp. 545.

Kellogg, et al., "Bringing Gesture Recognition to All Devices", Proceedings of the 11th USENIX Symposium on Networked Systems Design and Implementation, pp. 303-316, Apr. 2014.

Kellogg, et al., "Wi-Fi Backscatter: Internet connectivity for RF-powered devices", SIGCOMM, pp. 607-618, Aug. 2014.

Kurs, et al., "Wireless power transfer via strongly coupled magnetic resonances", Science, 317(5834), pp. 83-86, Jul. 2006.

Liu, et al., "Ambient backscatter: wireless communication out of thin air", ACM SIGCOMM, pp. 39-50, Jun. 2013.

Low, et al., "Design and test of a high-power high-efficiency loosely coupled planar wireless power transfer system", IEEE Transactions on Industrial Electronics, 56(5), pp. 1801-1812, May 2009.

Mikeka, et al., "DTV band micropower rf energy-harvesting circuit architecture and performance analysis", 2011 IEEE International Conference on RFID, pp. 561-567, Sep. 2011.

Naderiparizi, et al., "Wispcam: A battery-free RFID camera", 2015 IEEE International Conference on RFID, pp. 166-173, Jun. 2015.

Olgun, et al., "Design of an efficient ambient wifi energy harvesting system", Microwaves, Antennas Propagation, IET 6(11), pp. 1200-1206, Aug. 2012.

Olgun, et al., "Efficient ambient wifi energy harvesting technology and its applications," Antennas and Propagation Society International Symposium, IEEE, pp. 1-2, Jul. 2012.

Olgun, et al., "Wireless power harvesting with planar rectennas for 2.45 ghz rfids", Electromagnetic Theory (EMTS), pp. 329-331, Aug. 2010.

Omnivision, "OV7670/OV7171 CMOS VGA (640x480) CameraChip with OmniPixel Technology by OmniVision", http://www.voti.nl/docs/OV7670.pdf, Jul. 2005.

Ossia, , "Cota by Ossia", http://www.ossiainc.com/, last accessed Oct. 2018.

Panasonic, "Panasonic BK-4MCCA12SA AAA Nicekl Metal Hydride Batteries", http://www.amazon.com/Panasonic-BK-4MCCA12SA-Pre-Charged-Rechargeable-Batteries/dp/B00JHKSMG8, last accessed Oct. 2018.

Parks, et al., "A wireless sensing platform utilizing ambient rf energy," Biomedical Wireless Technologies, Networks, and Sensing Systems, IEEE, pp. 154-156, Sep. 2013.

Parks, et al., "Sifting through the airwaves: Efficient and scalable multiband rf harvesting," 2014 IEEE International Conference on RFID, pp. 74-81, Apr. 2014.

Phantomjs, "PhantomJS Scriptable Headless Browser", http://phantomjs.org/, Jan. 14, 2015.

Pozar, "Microwave Engineering", Second Edition, John Wiley & Sons, pp. all, Aug. 1997.

Pulse Electronic, "Wireless External Antenna for 2.4GHz Antenna", http://productfinder.pulseeng.com/products/datasheets/W1010.pdf, last accessed Oct. 2014.

Rodgers, "RO4000 Series High Frequency Circuit Materials", http://www.rogerscorp.com/documents/726/acm/RO4000-Laminates---Datasheet.pdf, last accessed Oct. 2018.

Sample, et al., "Design of an RFID-based battery-free programmable sensing platform", IEEE Transactions on Instrumentation and Measurement, 57(11), pp. 2608-2615, Nov. 2008.

(56) References Cited

OTHER PUBLICATIONS

Sample, et al., "Experimental results with two wireless power transfer systems", Radio and Wireless Symposium, IEEE, Jan. 2009, pp. 16-18.
Sample, et al., "Optical localization of passive UHF RFID tags with integrated LEDs", 2012 IEEE International Conference on RFID, pp. 116-123, May 2012.
Seiko, "MS Lithium Rechargeable Battery MS412FE micro-battery by Seiko", http://www.sii.co.jp/compo/catalog/battery_en.pdf., last accessed Oct. 2018.
Seiko, "S-882Z Series Ultra-low Voltage Operation Charge Pump IC for Step-Up DC-DC Converter Startup" http://www.eet-china.com/ARTICLES/2006MAY/PDF/S882Z_E.pdf, last accessed Oct. 2018.
Shigeta, et al., "Ambient rf energy harvesting sensor device with capacitor-leakage-aware duty cycle control", Sensors Journal, IEEE, 13(8), Aug. 2013, pp. 2973-2983.
Skyworks, SMS7630-061, "Surface Mount, 0201 Zero Bias Silicon Schottky Detector Diode", Skyworks website, http://www.skyworksinc.com/uploads/documents/SMS7630_061_201295G.pdf, Oct. 2018, pp. all.
Souppouris, "This router can power your devices wirelessly from 15 feet away", Engadget, http://www.engadget.com/2015/01/05/energous-wattup-wireless-chargingdemo/, Jan. 5, 2015.
Talla, et al., "Hybrid analog-digital backscatter: A new approach for battery-free sensing", 2013 IEEE International Conference, Jun. 2013, pp. 74-81.
Talla, et al., "Powering the Next Billion Devices With Wi-Fi", University of Washington, May 2015, pp. all.
Tesla, "My Inventions: Nikola Tesla's Autobiography; at the age of 63 Tesla tells the story of his creative life", Electrical Experimenter Magazine, 1919, pp. all.
Texas Instruments, "bq25570 Nano Power Boost Charger and Buck Converter for Energy Harvester Powered Applications", http://www.ti.com/lit/ds/symlink/bq25570.pdf, last accessed Oct. 2018.
Texas Instruments, "LMT84 Temp Sensor by Texus Instruments", http://www.ti.com/lit/ds/symlink/lmt84.pdf, last accessed Oct. 2018.
Texas Instruments, "MSP430FR596x Mixed Signal Microcontrollers by Texas Instruments", http://www.ti.com/lit/ds/symlink/msp430fr5969.pdf, last accessed Aug. 2018.
Trotter, et al., "Power optimized waveforms for improving the range and reliability of rfid systems", 2009 IEEE International Conference on RFID, May 2009, pp. 80-87.
Trotter, et al., "Survey of range improvement of commercial rfid tags with power optimized waveforms" IEEE RFID 2010, May 2010, pp. 195-202.
Valenta, et al., "Harvesting Wireless Power: Survey of energy-harvester conversion efficiency in far-field, wireless power transfer systems", Microwave Magazine, IEEE, 15(4), Jun. 2014, pp. 108-120.
Vera, et al., "Design of a 2.45 GHz Rectenna for Electromagnetic (EM) Energy Scavenging", RWS'10 Proceedings of the 2010 IEEE conference on Radio and wireless symposium pp. 61-64, Jan. 2010.
Visser, et al., "Ambient RF Energy Scavenging: GSM and WLAN Power Density Measurements", 38th European Microwave Conference, Oct. 2008, pp. 721-724.
Waters, et al., "Powering a Ventricular Assist Device (VAP) WIth the Free-Range Resonant Electrical Energy Delivery (FREE-D) System", Proceedings of the IEEE, 100(1), Jan. 2012, pp. 138-149.
Wireless Power, "Introduction to the Power Class 0 Specification", Version 1.2.3, Feb. 2017, pp. all.

\* cited by examiner

POWER TRANSMISSION USING WIRELESS COMMUNICATION SIGNALS

CROSS-REFERENCE TO RELATED APPLICATION(S)

This application is a 35 U.S.C. § 371 National Stage Application of PCT Application No. PCT/US2015/048630, filed on Sep. 4, 2015, which claims the benefit under 35 U.S.C. § 119(e) of the earlier filing date of U.S. Provisional Application 62/046,818, filed Sep. 5, 2014. This application also claims the benefit under 35 U.S.C. § 119(e) of the earlier filing date of U.S. Provisional Application 62/111,567, filed Feb. 3, 2015. This application also claims the benefit under 35 U.S.C. § 119(e) of the earlier filing date of U.S. Provisional Application 62/185,332, filed Jun. 26, 2015. All afore-mentioned applications are hereby incorporated by reference in their entirety, for any purpose.

STATEMENT REGARDING RESEARCH & DEVELOPMENT

This invention was made with government support under grant CNS-1407583 awarded by the National Science Foundation. The government has certain rights in the invention.

TECHNICAL FIELD

Examples described herein relate generally to wireless delivery of power, for example, example devices may be configured to deliver power over and other example devices may be configured to harvest power from received Wi-Fi signals.

BACKGROUND

Wireless communication is extremely well established billions of people rely on it every day. Wireless power has not been as successful. Near-field, short range schemes are gaining traction for certain range-limited applications, like powering implanted medical devices and recharging cars and phones from power delivery mats. However, these systems are limited to use in near-field. Some schemes for power delivery may require significant custom hardware.

The "internet of things" is a vision in which a large number of devices that sense, compute, and actuate are connected to the internet. One problem for the internet of things is the challenge of powering a large number of devices. Wires are intrusive and expensive to install. It can cost $5K to install a wired sensor in a modern semiconductor foundry, due to the expense of the wire, the conduit, and installation labor, for example. Batteries have finite lifetime, and add cost and weight. Changing batteries in a lame number of devices is extremely burdensome, and thus far has rendered the internet of things impractical.

SUMMARY

Examples of methods are described herein. An example method includes detecting, at a wireless transmitter, wireless communication traffic is below a threshold traffic level, and when the wireless communication traffic is below the threshold level, transmitting power packets over multiple communication channels.

The detecting may comprise accessing a number of packets in a queue of the wireless transmitter.

The example method may include inserting the power packets in the queue when the number of packets in the queue is below the threshold level.

An example power packet may include a UDP broadcast packet.

The example method may further include using the wireless transmitter to perform transmitting the power packets. The wireless transmitter may be configured to transmit data signals using a first antenna and the wireless transmitter may be further configured to transmit the power packets using a second antenna.

The example method may include using the wireless transmitter to transmit data signals and using another device to perform transmitting the power packets.

In some examples, the wireless transmitter may be configured to transmit a Wi-Fi signal.

In some example methods, a number or data rate of the power packets is selected based at least in part on electrical characteristics of harvesting circuitry configured to harvest power from the power packets.

Some example methods further include use of a control loop whereby the wireless transmitter selects the number or data rate of the power packets based at least in part on the electrical characteristics.

Examples of devices are described herein. An example device includes at least one antenna, a queue configured to store packets for data transmission from the at least one antenna in accordance with a wireless communication technique, and at least one computer readable media encoded with executable instructions that, when executed by at least one processing unit, cause the device to insert power packets in the queue when fewer than a threshold number of packets are stored in the queue for data transmission.

In some examples, the threshold number is based, at least in part, on electrical characteristics of power harvesting circuitry configured to receive transmissions from the device.

In some examples, the power packets are configured for transmission on multiple communication channels. In some examples, the multiple communication channels each correspond with different frequencies.

In some examples, the multiple communication channels are distinguished spatially using multiple antennas. In some examples, the power packets comprise UDP broadcast packets. In some examples, the data transmission comprises Wi-Fi data transmission.

Another example device includes an antenna, power harvesting circuitry coupled to the antenna, wherein the power harvesting circuitry is configured to harvest power from multiple channels of wireless communication signals received at the antenna, wherein the wireless communication signals include data packets and power packets inserted into the wireless communication signals, and an electrical interface coupled to the power harvesting circuitry and configured to provide the power to an electrical device.

In some examples, the power harvesting circuitry includes a rectifier coupled to a DC-DC converter. In some examples, components of the rectifier and DC-DC converter are selected based on an impedance variation across frequencies of a combination of the rectifier and DC-DC converter.

In some examples, the power harvesting circuitry further comprises a matching network configured to match an impedance of the antenna to an impedance of the combination of the rectifier and the DC-DC converter.

In some examples, the electrical interface comprises a USB interface.

In some examples, the device is further configured to transmit signals using the antenna in accordance with backscatter communication techniques.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, and software operations have not been shown in detail in order to avoid unnecessarily obscuring the described embodiments of the invention.

Examples described herein include systems which ma deliver power over wireless communication signals, such as Wi-Fi. Accordingly, example systems may allow power delivery to occur using, existing wireless transmission hardware, such as existing Wi-Fi chipsets.

Figure 1:
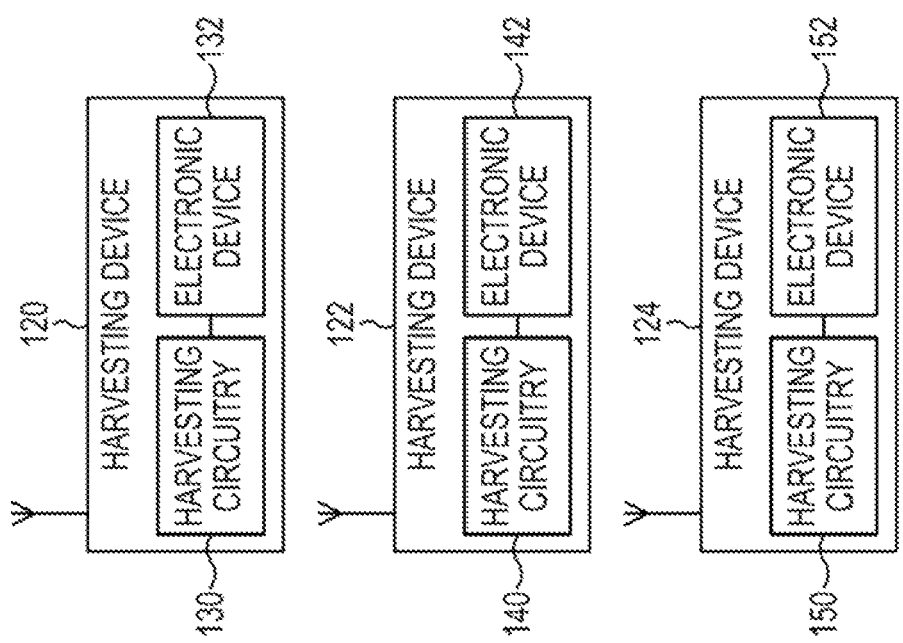
FIG. 1 is a schematic illustration of a system arranged in accordance with examples described herein.
Figure 1:
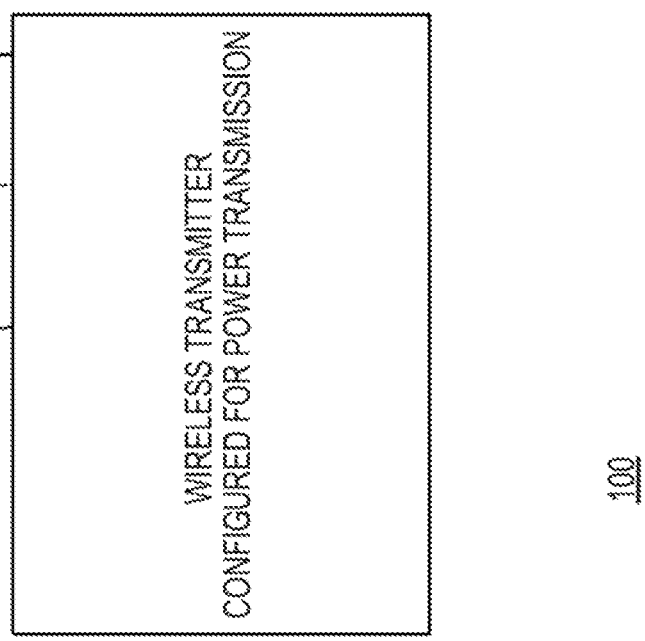

FIG. 1 is a schematic illustration of a system arranged in accordance with examples described herein. The system 100 includes a wireless transmitter 105 configured for power transmission. The wireless transmitter 105 may have any number of antennas, including antenna 110 and antenna 112. The system 100 may include any number of harvesting devices. Harvesting device 120, harvesting device 122, and harvesting device 124, are shown in FIG. 1. Other devices may be included in the system 100 of FIG. 1, such as but not limited to devices which may receive data transmissions but not necessarily power transmissions from the wireless transmitter 105.

In some examples, each antenna provided with the wireless transmitter 105 may be used for transmitting on a different wireless communication channel. For example, three antennas may be provided for transmission on three wireless communication channels (e.g. Wi-Fi channels at three different frequencies). In some examples, MIMO techniques may be used for transmitting clients on these antennas and the antennas may be used for power packet transmissions during silent intervals between client transmissions. Generally, there is no fundamental tradeoff between MIMO and power transmission techniques described herein.

The wireless transmitter 105 may be configured to transmit wireless communication signals. Examples of wireless communication signals include, but are not limited to, Wi-Fi signals (e.g. OFDM signals, 802.11g signals, 802.11n signals, other Wi-Fi variations), other active digital radio communication schemes such as but not limited to 3G, 4G, 5G, LTE, WiMax, Bluetooth, Bluetooth, LE, Zigbee, white space transmissions, and Industrial, Scientific, and Medical (ISM) bands. Generally, wireless communication signals having a high peak-to-average ratio (e.g. OFDM signals) may be desirable for use in transmitting power.

Generally, wireless communication signals transmitted by the wireless transmitter 105 may be bursty in nature (e.g. the signals may not include a continuous power component, and may include periods in which no signal or a very weak signal is transmitted). It may be difficult to implement systems where power is transmitted using wireless communication signals when the wireless communication signals are bursty in nature. For example, devices requiring power (e.g. harvesting devices) may have certain minimum voltage and/or current requirements which should be continuously (or nearly continuously) met by a power source. Power harvesting circuitry may be able to extract power from bursty signals during the burst periods, but during the silent periods the voltage and/or current provided to the device may decline, potentially falling below acceptable thresholds. Continuous transmission from a wireless source, however, may deteriorate the performance of its own clients as well as other networks. Accordingly, examples described herein may include systems, devices, and methods for providing increasingly continuous wireless communication signal transmissions while minimizing or reducing impact on performance of the data communicating function of the network and neighboring networks.

Accordingly, the wireless transmitter 105 may be specially configured for power transmission. For example, the wireless transmitter 105 may be configured to transmit more signals (e.g. more packets) than would normally be required by the data operations of the wireless transmitter 105. Software and/or drivers may be provided in the wireless transmitter 105 which allow the wireless transmitter 105 to transmit power packets in accordance with examples described herein. Software may include executable instructions encoded on one or more computer readable media (e.g. memory including, but not limited to non-volatile memory such as but not limited to Flash or ferroelectric RAM) which, when executed, cause one or more processing unit(s) (e.g. processor(s) and/or custom circuitry) of the wireless transmitter 105 to perform acts described herein.

In some examples, the wireless transmitter 105 may inject superfluous broadcast traffic (e.g. power packets) on one or more channels (e.g. Wi-Fi channels, such as Wi-Fi channels 1, 6, and 11) such that cumulative occupancy across channels is above a threshold level. The power packets may be implemented, for example, using UDP broadcast packets. UDP broadcast packets generally do not require acknowledgements from clients, either at the PHY layer or at higher layers. Accordingly, UDP broadcast packets may be inserted as power packets described herein. Other packets may be used in other examples. Generally, it may be desirable to maximize and/or increase output power from the wireless transmitter while reducing and/or eliminating impact to data traffic (e.g. client traffic).

Power packets generally may be implemented using wireless communication signals from which examples of harvesting circuitry described herein may extract power. Power packets include those packets which are inserted into the communication system in order to provide additional power transmission capability beyond that present from client traffic (e.g. data traffic) alone. In some examples, power packets may include data which may be decoded by one or more electronic devices in the system. All data packets are power packets, since all data packets carry power. In some examples, the power packets may not include data. Thus not all power packets are data packets. The power packets may in some examples advantageously have a higher peak-to-average power ratio in order to improve the ability of harvesting circuitry to extract power from the power packets. If certain data bit sequences result in higher peak-to-average power ratio, power packets containing dummy data may be created by choosing data sequences that produce packets with high peak to average power ratio. Some dummy data bit sequences may produce packets with higher total energy, in which case these dummy bit sequences would be preferred.

In some examples, the wireless transmitter 105 may include a queue (not shown in FIG. 1), which may be implemented, for example, using a memory or other electronically accessible storage. The queue may store data packets (e.g. Wi-Fi packets) to be transmitted by the wireless transmitter 105 for use in data communications. The wireless transmitter 105 may further include logic, software, and/or drivers which may inject additional traffic (e.g. power packets) when a number of packets contained in the queue is below a threshold level. When a number of packets contained in the queue is above a threshold level, no additional power packets may be inserted. Accordingly, impact on associated clients may be minimized or reduced, as extra traffic is injected only during times of low network communication.

The threshold level for the queue when power packets may be inserted for communication may be set in accordance with a level which ensures sufficient traffic that voltage at a DC-DC converter of harvesting circuitry described herein does not fall below an operating threshold between transmitted packets. The threshold level may be set in the wireless transmitter when the wireless transmitter is provided, or it may be discovered by the wireless transmitter during a configuration period. In one example, the threshold level may be five frames. For example, for thresholds less than five, the occupancy may decrease since the queue is repeatedly drained and the user space program that sends power packets (e.g. UDP broadcast packets) was unable to keep the queue full. Larger threshold values, on the other hand, may require more frequent transmissions, resulting in increased slowdown for client traffic. Other threshold values may be used in other examples.

In some examples, injected additional traffic (e.g. power packets) may be transmitted by the wireless transmitter 105 using a highest available bit rate. Since higher-rate transmissions occupy the channel for a smaller duration, impact on other communication networks may be minimized and/or reduced. If the power packet (e.g. UDP broadcast packet) rate is high, then frames may pile up in the queues and affect the kernel's responsiveness. On the other hand, a low rate may significantly reduce the occupancy across wireless communication channels. Generally, as long as inter-packet timing is less than the length of corresponding frames on the air, varying the queue-depth threshold may not significantly affect occupancy in the absence of data traffic (e.g. client traffic). In one example, 1500 byte packets UDP broadcast packets may be used as power packets and may be transmitted at the highest 802.11a bit rate of 54 Mbps. These packets occupy around 160 μs on the wireless channel, and an inter-packet delay of 100 μs was used to balance occupancy and kernel responsiveness. Other rates and delays may be used in other examples.

Power packets (e.g. UDP broadcast packets) may be transmitted at the highest available wireless communication bit rate. These transmissions occupy the channel for a shorter duration than transmissions at lower Wi-Fi bit rates. Thus, for the average transmitter bit rate in the network, better than equal-share fairness may be achieved even with the added packets.

In some examples, the wireless transmitter 105 configured for power transmission may employ (e.g. be programmed with) a user-space program that injects 1500-byte UDP broadcast datagrams with a constant inter-packet delay. A selective transmission mechanism may be used that hoists information from the MAC layer to the IP layer. An example mechanism has three main components. A first component is a power socket (e.g. Power_Socket). Power socket may be implemented using a standard UDP broadcast socket with the addition of a custom IP option, IP_Power, distinguish its outgoing. IP datagrams from other traffic. A second component is a power MAC shim (e.g. Power_MACshim). The power MAC shim may be a shim interface between the IP stack and the mac80211 subsystem that enables the IP stack to query the Wi-Fi subsystem for the queue status of individual channels. On socket creation, the user-space program sets an additional IP option with an integer that uniquely identifies the corresponding wireless interface at the wireless transmitter 105. A third component is IP power. IP power refers to a mechanism in the IP stack that cheeks for power packets on the outgoing IP datagrams and uses the shim interface to decide when to drop the power packets.

The decision about dropping packets may be performed on a per-packet basis in the packet transmission logic of the IP stack, e g., ip_local_out_sk( ), to check whether the pending queue depth is above a threshold value. This check may be channel specific; it may be applied after the kernel has determined a route and therefore an interface for the picket. If the queue depth is indeed at or above a threshold value, then there are already enough power and data and/or broadcast packets in the queue to maximize channel occupancy. In this case the wireless transmitter 105 (e.g. router) may drop the power packet before transmitting it and returns a corresponding error code to user space. On the other hand, if the queue depth is below the threshold value, then IP_Power may queue the packet for transmission at the MAC layer. In some examples, the wireless transmitter 105 may be configured to provide Internet connectivity on only one 2.4 GHz Wi-Fi channel. Thus, on the other Wi-Fi channels, there are no data (e.g. client) packets in the queue and hence we no power packets (e.g. UDP broadcast packets) are dropped on those channels.

The wireless transmitter 105 configured for power transmission may be implemented using any of a variety of devices suitable for transmitting a wireless communication signal. Example devices which may be used to implement wireless transmitter 105 include but are not limited to routers, access points.

Examples wireless transmitters may accordingly provide far field wireless power (e.g. at distances away from the transmitting antenna which are greater than a Fraunhofer distance). In some examples, the wireless transmitters providing power and/or other wireless transmitters in example systems may further provide transmitted data. Using example techniques and systems for power delivery described herein, network performance of data delivery may not be significantly harmed by the transmission of power.

In some examples, systems having multiple wireless transmitters configured for power transmission may be provided—e.g. while only one wireless transmitter 105 is shown in FIG. 1, any number may be present. Multiple wireless transmitters may be allowed to concurrently transmit their power packets. While this may create collisions between the power traffic, it may be acceptable since the power packets (e.g. UDP broadcast packets) do not need to be decoded by any specific client. As a result, the cumulative channel occupancy at each of the wireless transmitters may remain sufficiently high for power transmission.

In some examples, one wireless transmitter in a system having multiple wireless transmitters configured for power transmission may be a leader wireless transmitter. The leader wireless transmitter may transmit a pattern including a short packet with a 1-byte payload transmitted at a certain data rate (e.g. 54 Mbps), followed by a DIFS period and then a power packet. Other wireless transmitters decode this short packet and join the packet transmission of the leader router within the DIFS period. This strategy may ensure that all nearby wireless transmitters configured for power transmission transmit power packets concurrently and hence do not reduce the network's capacity.

Concurrent may be enabled from the follower wireless transmitters using software by setting CWmin and Cwmax to 1, preventing carrier sense backoff by setting the noise floor registers to "high" and placing their power packets in a high-priority queue. In some examples, distributed algorithms may be used to allow multiple wireless transmitters to identify the leader transmitter.

The wireless transmitter may utilize a same antenna or antennas for routine data (e.g. client) traffic as for power packets. In some examples, however, an additional transmitter may be added to an existing wireless device (e.g. an existing router). For example, in one embodiment, a 915 MHz transmitter is added to a Wi-Fi access point. The 915 MHz transmitter may be on continuously to provide a large amount of RF power. This transmitter may be separate from a data transmitter in the WiFi access point and, in some embodiments, the transmitter may be disconnected from any data source to which the data transmitter is connected. That is, in some embodiments, the 915 MHz transmitter is non-data transmitter that does not transmit or receive data. Other frequencies and frequency ranges are also contemplated for the secondary transmitter. In embodiments, the secondary transmitter may be connected to a different data source than the data transmitter and/or may transmit data at a lower rate than the data, transmitter.

In some examples, the 915 MHz transmitter may be pulsed to create a form of "power optimized waveform." The pulsing occurs in such a fashion that the average power from the transmitter may be at the legal power limit. The pulsed signal may have a higher "Peak to Average Power Ratio" (PAPR) than a continuous wave signal. The higher peak amplitudes allow more efficient harvesting by the non-linear diodes used for rectification.

In some examples, the wireless communication signal itself is used to both power and communicate with harvesting devices. Downlink data from the wireless transmitter to harvesting devices or other devices in the system may be encoded using, for example methods described in application 61/938,576, which application is hereby incorporated by reference in its entirety, anti by encoding data in packet lengths, or other mechanisms. Uplink data from devices to die wireless transmitter may be encoded for example, using backscatter. A difference from conventional RFID systems may be that the packets from the wireless transmitter may contain additional high data rate information intended for powered devices such as laptops.

In some examples, a dual-purpose modulation scheme may be used, in which one modulation scheme designed for low power decoding co-exists with another, higher-performance modulation scheme that requires higher power to decode. As one application, such a scheme may be used as a low power wake up radio. The low power encoding method may be used to communicate a wake up command to a power constrained device; once the device is awake, it can use its higher power communication apparatus to communicate with high data rates and high reliability.

The use of wireless communication signals to broadcast power to one or multiple devices in a system may be advantageous for a number of reasons. While it is to be understood that not all examples described herein may provide all or even any of these advantages, some example advantages are provided to facilitate understanding. Generally, wireless communication signals may be ubiquitous in indoor environments and generally operate in the unlicensed. ISM band where transmissions can be legally modified to deliver power. In some examples, purposing Wi-Fi or other wireless communication signal networks for power delivery can ease the deployment of RF-powered devices without additional power infrastructure. Wi-Fi chipsets provide a relatively cheap and ubiquitous platform for sending power-optimized waveforms, which may enable efficient power delivery. Generally, sensors and mobile devices are increasingly equipped with 2.4 GHz antennas for w communication via Wi-Fi, Bluetooth or ZigBee. These same antennas may be used for both communication and Wi-Fi power harvesting with a negligible footprint on the size of the device in some examples.

The system 100 may also include any number of harvesting devices, including harvesting device 120, harvesting device 122, and harvesting device 124 shown in FIG. 1. The harvesting devices may harvest power from wireless communication signals received from the wireless transmitter 105. In some examples, some or all of the harvesting devices may also receive data from the wireless transmitter 105 and/or may transmit date to the device implementing the wireless transmitter 105, which may occur, for example, using backscatter communications.

In some examples, wireless transmitters described herein, such as the wireless transmitter 105 of FIG. 1 may be aware of (e.g. may store, discover, and/or have a value communicated to the wireless transmitter) one or more electrical characteristics of harvesting circuitry to which the wireless transmitter will be transmitting power. In some examples, the wireless transmitter 105 may tune its transmission strategy to precisely fit the harvesting circuitry's power requirements. In one example, it may be desirable to read a temperature sensor range per minute. The wireless transmitter 105 may modulate its occupancy to deliver energy to the harvesting circuitry so that the sensor reaches its required voltage of 2.4V just in time, minimizing the total channel occupancy subject to this goal and thereby minimizing its effect on other networks.

Accordingly, in some examples, to identify a desired channel occupancy for a given application, in some examples the wireless transmitter 105 may evaluate and/or utilize known values for electrical characteristics of the harvesting circuitry. In some examples the wireless transmitter 105 may evaluate and/or utilize values for electrical characteristics of the harvesting circuitry that were sensed at the harvesting device, and communicated to the transmitting device through a communication channel. So, for example, a control loop may be formed that includes the wireless transmitter and the harvesting device to assess one or more electrical characteristics of the harvesting circuitry (e.g. power requirement, voltage requirement at a DC-DC converter). A feedback signal may be sent from the harvesting circuitry and/or an electronic device in communication with the harvesting circuitry to provide a value of the electrical characteristic being used to influence desired channel occupancy (e.g. rate and/or quantity of power packets to be transmitted). In some examples, voltage provided to a DC-DC converter which may be provided by a rectifier is desired to be kept at or above a threshold voltage. Generally, a rectifier converts incoming wireless communication transmissions into DC voltage to charge a storage capacitor. Once the voltage on the capacitor reaches the required threshold (e.g. Vth=2.4V, for the example temperature sensor), a reading occurs. Suppose the average power at the harvesting circuitry after multi-path reflections and attenuation is Pin and the channel occupancy of the wireless transmitter packets is C. To a first approximation, the harvester's behavior can be modeled
as a DC voltage source charging, a capacitor through a resistor. The difference, however, is that the approximated resistance value depends on the impedance of the harvester's diodes, which is a function Pin and C. The voltage at an output of the rectifier as a function of time may be expressed as:

$$V(t)=V_0 * e^{-1/\tau(P_{in}C)} + V_{max}(P_{in}C) * (1-e^{-1/\tau(P_{in}C)})$$

where V0 is the initial voltage, τ is the time constant, and Vmax is the maximum achievable voltage. Note that both τ and Vmax are functions of Pin and the channel occupancy. Given the non-linearities of diodes, it may be difficult to obtain closed-form solutions for τ (Pin,C) and Vmax (Pin, C). Accordingly, an experimental model may be used by measuring the output voltage and fitting with the exponential model. It is obsessed that Vmax is inverse-linearly proportional to the input power and channel occupancy and the time constant τ is exponentially proportional to the input power and/or the channel occupancy; it takes exponentially more time for the same increment in the voltage at a higher voltage value than at a lower one.

To reduce the impact of power packets on neighboring networks, wireless transmitters described herein may minimize or reduce a total number of power packets required to collect a sensor reading. When there are packets on the air, the capacitor in a harvesting circuitry may charge exponentially. However, when there are no packets, the voltage on the capacitor may discharge exponentially. To maximise the effectiveness of power delivery, wireless, transmitters configured for power transmission may minimize or reduce capacitor leakage. This may be achieved by using channel occupancy modulation schemes described herein. Generally, in every sensor update time window (T), the wireless transmitter may transmit no power packets for a period (T-δt), then transmits power packets for a period of δt, targeting a channel occupancy of 0≤C≤1. When the channel occupancy is zero, the voltage on the capacitor in the harvesting circuitry may be very low and there may be no leakage. However, when a sensor update is required,
a high channel occupancy continuously charges the capacitor (e.g. minimizing leakage) to maximize and/or improve the effectiveness of power delivery. The wireless transmitter may utilize a δt and C to minimize and/or reduce the mean of the power packet occupancy given by C*(δt/T). Different C and δt values may be evaluated in the empirical model described herein to find a minimum value.

The search space may be reduced by noting that for a given Pin, there is a minimum value of C below winch the threshold voltage is not achievable. Further, given a channel occupancy, the time constant that limits the value of δt to a maximum value of τ (Pin,O) may be known. Finally, the granularity by which channel occupancy can be modulated may be limited to a limit, such as to 10%. Using these values, the search space may be reduced.

To allow the wireless transmitter 105 to estimate available power Pin at the harvesting device, the wireless transmitter 105 may initially transmit power packets at a high occupancy, e.g. around 90%, and notes the times when the sensor outputs a reading. The wireless transmitter 105 may be programmed with the described empirical model to estimate Pin for the next cycle. At the end of every cycle, the wireless transmitter 105 may re-estimate Pin to account for wireless channel changes. Second, in the presence of multiple harvesting devices, the wireless transmitter 105 may optimize the parameters to satisfy the minimum duty cycle requirement across multiple harvesting devices.

The harvesting devices may be configured to harvest power across multiple wireless communication channels (Wi-Fi channels). In some examples, different wireless communication channels may correspond to different frequencies or frequency ranges. In some examples, spatial diversity may be used to define different wireless communication channels, for example using MIMO techniques. Recall that wireless transmitters described herein may be configured to inject extra traffic (e.g. power packets) on multiple channels to maintain cumulative traffic across channels above a threshold level. Accordingly, example harvesting devices may be configured to harvest power from multiple channels in order to harvest the desired amount of power. Although the power packets may be arriving at the harvesting devices different channels at different times depending on the data traffic in the network or neighboring networks, the harvesting devices may harvest across multiple channels such that it is effectively receiving a continuous transmission.

In some examples, the transmitter and harvesting devices may be configured to transfer power across multiple wireless communication channels at different frequencies. For example, a system might transfer power using both 2.4 GHz WiFi data packets and a 900 MHz power only signal.

Any of a variety of devices may be used to implement harvesting devices described herein. In some examples, the harvesting device may include power harvesting circuitry electronically coupled to another electronic device such that the harvesting circuitry may provide power to power that electronic device. For example harvesting circuitry 130 may provide power to electronic device 132 in harvesting device 120. For example harvesting circuitry 140 may provide power to electronic device 142 in harvesting device 122. For example harvesting circuitry 150 may provide power to electronic device 152 in harvesting device 124. The harvesting circuitry may be integral to or in electronic communication with the electronic device such as using a USB connector or other electronic interfaces. In some examples, any device having a Wi-Fi chipset may be used to harvest power from wireless transmitters configured for power transmission described herein. Examples of devices which may be powered by power harvesting circuitry described herein include, but are not limited to, battery recharges (e.g. nickel-metal hydride battery chargers, lithium-ion coin-cell battery charges), temperature sensors, cameras, image sensors, motion detection sensors, any environmental sensors, smoke detectors, burglar alarms, watches, and activity trackers.

Generally, examples of power harvesting circuitry implemented in harvesting devices may include circuitry which may efficiently receive power across multiple wireless communication channels (e.g. 2.4 GHz Wi-Fi channels). Because a fraction of the incident signal is typically reflected back into the environment and may be unusable due to impedance mismatches in the hardware, achieving well-matched impedances across a range of frequencies (e.g. over multiple wireless communication channels) may be challenging. Examples described herein co-design hardware components (e.g. rectifier, matching network, and DC-DC converter) to reduce reflection losses across a desired frequency band (e.g. 72 MHz Wi-Fi band).

Example harvesting devices may receive far field power from wireless transmitters configured for power transmission described herein. For example, power may be transmitted at distances of up to 5 feet in some examples, up to 10 feet in some examples, up to 15 feet in some examples, up to 20 feet in some examples, up to 30 feet in some examples, and at greater distances in some examples. The harvesting devices 120, 122, 124 may generally be located in a variety of locations within an environment relative to the wireless transmitter 105. For example, one or more of the harvesting devices 120, 122, 124 may have one or more walls, doors, floors, ceilings, pockets, bags, material, or other obstruction physically between the harvesting device and the wireless transmitter. Nonetheless, the harvesting devices may be able to receive wireless communication signals described herein through the wall, door, floor, ceiling, pocket, bag, material, or other obstruction, and remain powered by the wireless transmitter despite the obstruction.

Examples of harvesting devices may further include batteries (e.g. nickel-metal hydride batteries, lithium-ion batteries, or combinations thereof). Power harvesting circuitry described herein may provide power to recharge the batteries. The batteries may be used to power electronic devices. In this manner, batteries may be recharged using power harvesting from wireless communication signals described herein.

Figure 2:
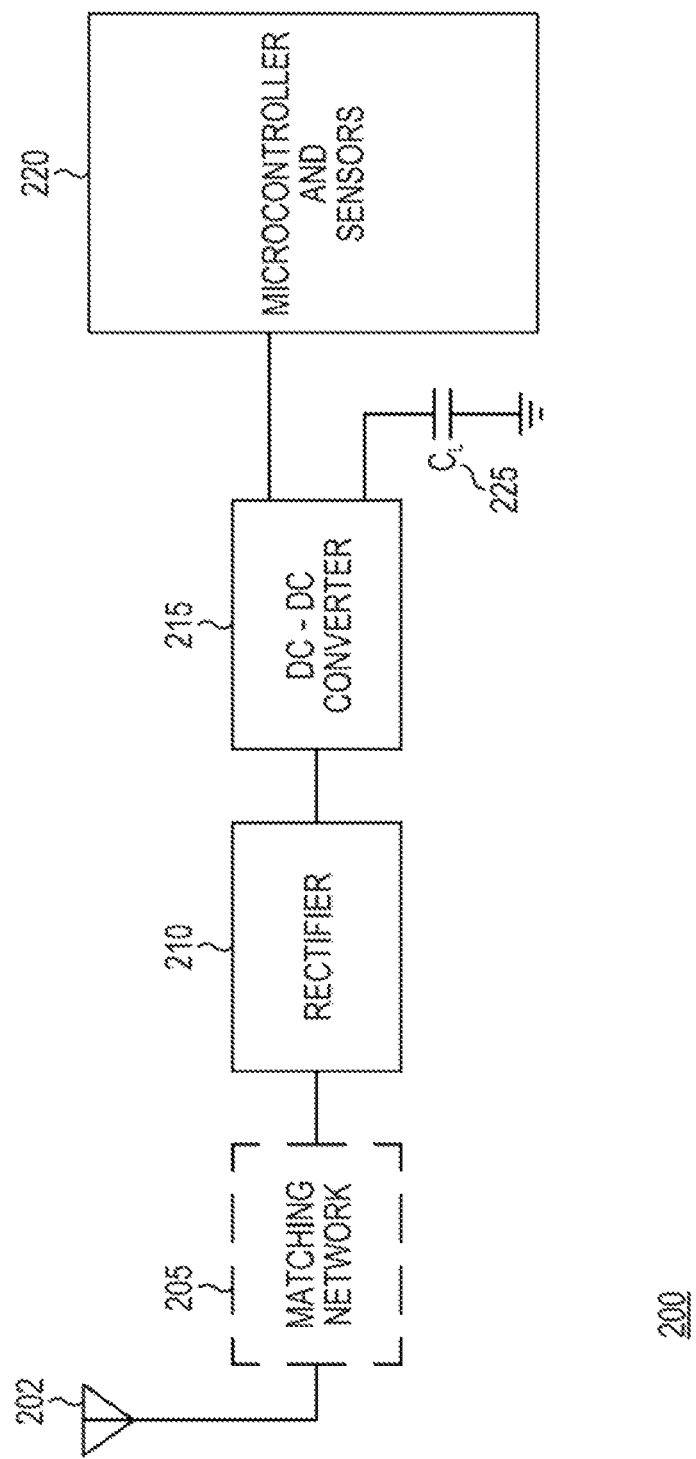
FIG. 2 is a schematic illustration of harvesting circuitry arranged in accordance with examples described herein.

FIG. 2 is a schematic illustration of harvesting circuitry arranged in accordance with examples described herein. The harvesting circuitry 200 includes a matching network 205 coupled to an antenna 202. The matching network 205 may be coupled to a rectifier 210. The rectifier 210 may be coupled to a DC-DC converter 215. The DC-DC converter 215 may be coupled to a capacitance 225 ($C_L$) and one or more microcontrollers and/or sensors 220. Instead of or in addition to the microcontrollers anchor sensors 220, the harvesting circuitry 200 may be in electronic communication to any of a variety of electronic devices to power the electronic devices. In other examples, additional components may be coupled between, in series, or in parallel with the components shown in FIG. 2. The harvesting circuitry 200 may be used to implement the harvesting circuitry 130 of FIG. 1, the harvesting circuitry 140 of FIG. 1, the harvesting circuitry 150 of FIG. 1, or combinations thereof. The microcontrollers and/or sensors 220 may be used to in the electronic device 132 of FIG. 1, the electronic device 142 of FIG. 1, the electronic device 152 of FIG. 1, or combinations thereof.

Generally, the harvesting circuitry 200 may be designed such that a minimum voltage and/or current may be maintained at an output of the DC-DC converter 215 to power the microcontrollers and/or sensors 220. The harvesting circuitry 200 may generally be designed to harvest across multiple wireless communication channels on which an associated wireless transmitter is transmitting. For example, in the case of 2.4 GHz, Wi-Fi, the harvesting circuitry 200 may be designed to efficiently harvest across multiple 2.4 GHz Wi-Fi channels. The harvesting circuitry 200 may generally be designed to achieve acceptable sensitivities across these multiple channels. Sensitivity generally refers to a lowest power at which the harvesting circuitry may power an electronic device (e.g. microcontrollers and/or sensors 220).

A carrier signal may be received at the antenna 202. While a single antenna 202 is shown in FIG. 2, multiple antennas may be used in other examples. The carrier signal may include wireless communication signals received from examples of wireless transmitters described herein, such as the wireless transmitter 105 of FIG. 1. The wireless communication signals tray include power packets inserted by the wireless transmitter for the purposes of providing power delivery to the harvesting circuitry 200.

A matching network 205 may be provided to transform an impedance of the rectifier 210 to match that on the antenna 202. The matching network 205 may be designed to address an impedance mismatch between the antenna 22 (e.g. a Wi-Fi antenna) and the harvesting circuitry 200. When the antenna 202 and input to the remaining harvesting circuitry 200 have significantly different impedances, a fraction of the signal may be reflected back, reducing the available power. The rectifier 210 is provided to convert a carrier signal received at the antenna 202 to a DC signal. However, the rectifier 210 may have a non-linear behavior with input power, operation frequency, and the DC-DC converter characteristics. Accordingly, it may be challenging to achieve sensitivity and efficiency across multiple wireless communication channels (e.g. across a frequency hand spanning multiple wireless communication channels, such as a 72 MHz hand spanning three Wi-Fi channels). Accordingly, the DC-DC converter 215 and the rectifier 210 may be co-designed to smooth performance over a wider frequency band and reduce requirements on the matching network 205.

The DC-DC converter 215 is provided the DC signal from the rectifier 210. The DC-DC converter 215 increases a voltage of the DC signal to match requirements of the microcontrollers and/or sensors 220 or other electronic device to be powered by the harvesting circuitry 200. Generally, the DC-DC converter 215 may have a minimum input threshold below which it cannot operate, or cannot reliably operate within desired operating ranges. In one example, the threshold for the input of the DC-DC converter 215 is 300 mV. Other thresholds ma be used in other examples. Wireless transmitters described herein may be configured to supply sufficient communication traffic to maintain an input voltage of the DC-DC converter above the input threshold.

Figure 3:
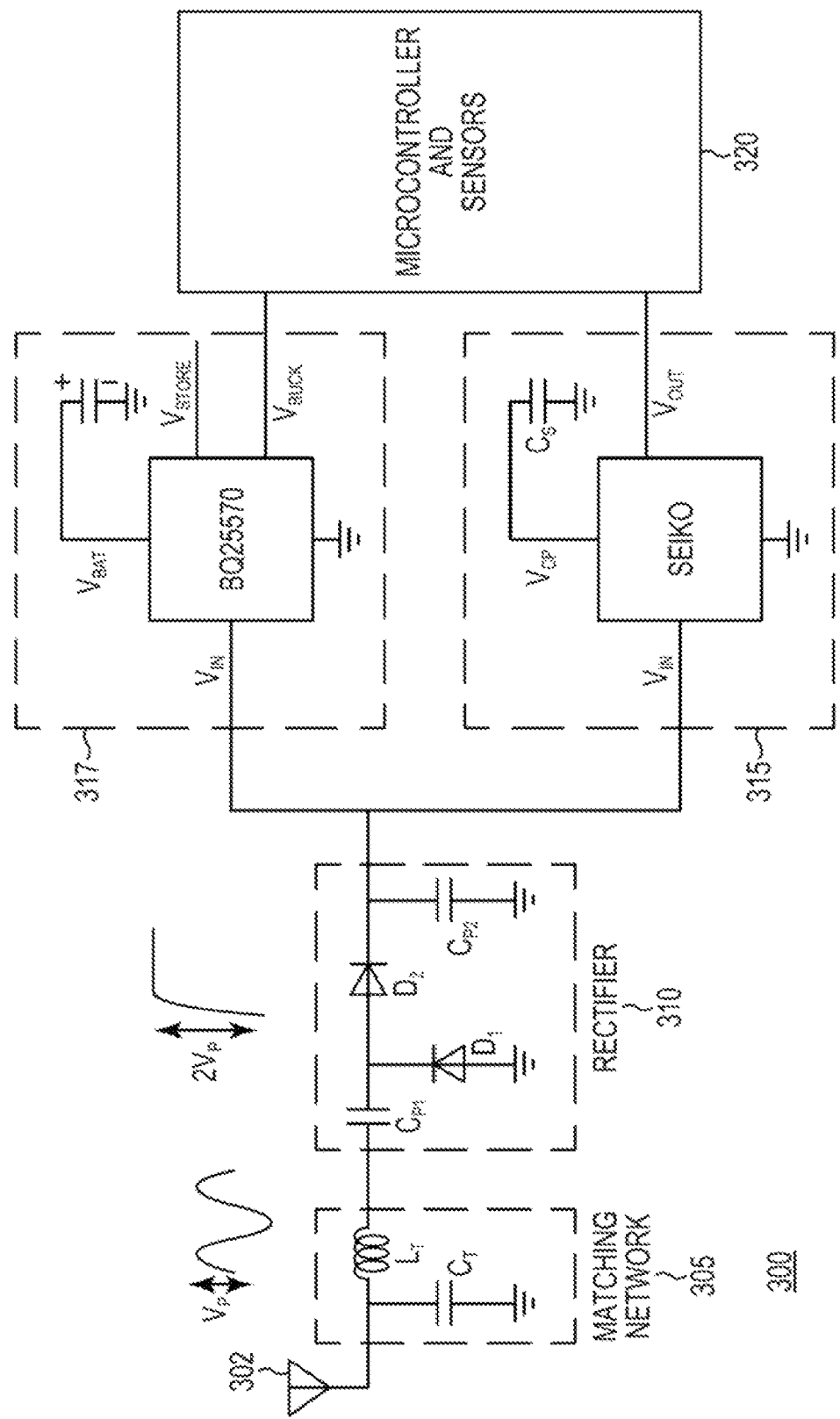
FIG. 3 is a schematic illustration of another example of harvesting circuitry arranged in accordance with examples described herein.

FIG. 3 is a schematic illustration of another example of harvesting circuitry arranged in accordance with examples described herein. The harvesting circuitry 300 is coupled to an antenna 302. The harvesting circuitry 300 includes a matching network 305 coupled to the antenna 302. The harvesting circuitry 300 includes a rectifier 310 coupled to the matching network 305. Two example DC-DC converters are shown, DC-DC converter 315 suitable for use in battery-free implementations (e.g. when the harvesting circuitry 300 may provide power to an electronic device without batteries). The DC-DC converter 317 may be suitable for use in battery-charging implementations (e.g. when the harvesting circuitry 300 may provide power to recharge batteries that may provide power to an electronic device). The DC-DC converter 315 and/or the DC-DC converter 317 is coupled to the rectifier 310. Microcontrollers and/or sensors 320 are coupled to the DC-DC converter 315 and/or the DC-DC converter 317.

Instead of or in addition to the microcontrollers and/or sensors 320, the harvesting circuitry 300 may be in electronic communication to any of a variety of electronic devices to power the electronic devices. In other examples, additional components may be coupled between, in series, or in parallel with the components shown in FIG. 3. The harvesting circuitry 300 may be used to implement the harvesting circuitry 130 of FIG. 1, the harvesting circuitry 140 of FIG. 1, the harvesting circuitry 150 of FIG. 1, or combinations thereof. The harvesting circuitry 300 may be used to implement the harvesting circuitry 200 of FIG. 2. The microcontrollers and/or sensors 220 may be used to implement the electronic device 132 of FIG. 1, the electronic device 142 of FIG. 1, the electronic device 152 of FIG. 1, or combinations thereof.

The antenna 302 is analogous to the antenna 202 of FIG. 2 and is not described further.

The rectifier 310 has a design selected to increase and/or maximize an output of the rectifier 310. An input capacitor $C_{p1}$ is coupled to the antenna 302 through a matching network 305. The input capacitor is coupled to ground through a first diode $D_1$. The input capacitor is coupled to the DC-DC converter 315 and/or 317 through, a second diode $D_2$. The diode $D_2$ is connected to ground through capacitor $C_{p2}$. The rectifier 310 is designed to track twice an envelope of an incoming analog signal and convert the envelope to power. For example, the rectifier 310 may add a positive and negative cycle of an incoming sinusoidal wireless communication signal (e.g. carrier signal) to double the amplitude. The configuration of diodes and capacitors shown in FIG. 3 are arranged to achieve this. In practice, the diodes and capacitors of the rectifier 310 may have losses which may limit the output power of the rectifier 310. Accordingly, components may be chosen which have lower losses. For example, the first and second diodes may be implemented using SMS7630-061 diodes by SKYWORKS Which may have ultra-miniature packages and may have low losses (e.g. loss threshold voltage, low junction capacitance, and minimal package parasitics). The capacitors may be implemented using high-quality-factor, low-loss, UHF-rated 10 pF capacitors in one example which minimize and/or reduce losses and maximize and/or improve efficiency and sensitivity of the rectifier 310.

The DC-DC converter 315 and/or 317 may serve two purposes: i) boost the voltage output of the rectifier 310 to the levels required by the microcontrollers and/or sensors 320, and ii) make the input impedance of the rectifier 310 less variable across multiple wireless communication channels (e.g. three Wi-Fi channels). In a battery-free design, all the hardware components of the harvesting circuitry 300 may be required to boot up from 0 V. Practical DC-DC converters, however, have a nonzero minimum voltage threshold. In one example, the SZ882 DC-DC converter from SEIKO is used to implement the DC-DC converter 315 which may start from input voltages as tow as 300 mV, which our rectifier can provide, and boost the output on a storage capacitor to 2.4V. Once the 2.4 V threshold is reached, the charge pump in the DC-DC converter 310 connects the storage capacitor to the output, powering the microcontrollers and/or sensors 320.

A DC-DC converter 317 may be further optimized while used to recharge a battery. For example, the battery may provide a minimum voltage level Mid hence the hardware components need not boot up from 0 V. In one example, the TI bq25570 energy harvesting chip may be used to implement the DC-DC converter 317 when the DC-DC converter is used to charge a battery. The TI chip contains a boost converter, a battery charger, voltage monitoring solutions and a buck converter. The rechargeable battery may be coupled to the battery charging node, Vbat, of the bq25570. The boost may be used as the DC-DC converter 317 to achieve the voltage required to charge the battery. The maximum power point tracking (MPPT) mode of the TI chip may be used to tune the input impedance of the DC-DC converter 317 so as to minimize the variation of the rectifier's impedance across multiple wireless communication channels. For example, we set the buck converter's MPPT reference voltage to 200 mV in one example. Generally, then, the DC-DC converter 317 may have an input impedance tuned to minimize and/or reduce variation of the rectifier's impedance across multiple wireless communication channels.

In this manner, with the rectifier 310 and DC-DC converter 315 and/or 317 co-designed to reduce variation of the impedance of the rectifier 310 across multiple wireless communication channels (e.g. across a frequency band) constraints on the matching network 305 may be relaxed, such that a single-stage LC matching network may be used to implement the matching network 305 and may match impedances between the rectifier 305 and the antenna 302 (e.g. a Ω antenna) across multiple wireless communication channels (e.g. across three Wi-Fi channels). Generally, in LC matching networks, inductors may be the primary source of losses. To mitigate this, high-frequency inductors may be used in 0402 footprint which have minimal parasitics and a quality factor of 100 at 2.45 GHz in some examples. The resulting matching network 305 may consume less board area than traditional transmission lines and distributed-element-based matching networks and may be modified to meet different system parameters without any loss or with reduced loss. In one example, 6.8 nH and 1.5 pF components are used as the LC matching network for as battery-free harvester using DC-DC converter 315, and 6.8 nH and 1.3 pF components are used to implement battery-recharging harvester using DC-DC converter 317.

Note that examples of harvesting circuitry described herein may not decode data in wireless communication signals. Accordingly, from the perspective of the harvesting circuitry, all transmissions from the wireless transmitter (e.g. a router) may look identical for the purposes of harvesting power. In this manner, similar amounts of power may be harvested from packets containing data (e.g. Wi-Fi data packets, beacon transmissions) as power packets (e.g. artificial packets).

In some examples, RF power received from wireless transmitters described herein may be increased when the wireless transmitter simultaneously transmits on multiple bands (e.g. 915 MHz, 2.4 GHZ, 5 GHz, etc. (or any pair of these)). Methods described in application 61/927,378 may be used to capture the power from these sources simultaneously, which application is hereby incorporated by reference in its entirety for any purpose. In some examples, power harvested from one hand by a completely "passive" harvester may be used to operate an "active" power harvester configured to capture power in another band. The active harvester might include circuit elements such as: circuit nodes that are biased to a non-zero voltage, actively switched transistors (instead of diodes), a DC-DC converter that requires power to start up, together with other elements.

Examples of wireless transmitters configured for power transmission described herein may accordingly be used to power any of a variety of electronic devices. A wide array of applications are anticipated. For example, harvesting circuitry described herein may be provided to power a camera. In some examples, a camera may be provided with one or more motion detection sensors which may be powered by harvesting circuitry described herein. The motion detection sensors may turn the camera on responsive to detection of motion, and the camera may be powered by the harvesting circuitry and/or batteries recharged by the harvesting circuitry described herein.

In some examples, cameras and/or sensors powered by harvesting circuitry described herein may be deployed in hard-to-reach locations where battery replacement is undesirable—e.g. walls, attics, pipes, sewers, remote locations, dangerous locations.

In some examples, wireless transmitters (e.g. routers) configured for power transmission as described herein may be used as charging hotspots. For example, in addition to or instead of powering custom sensors and/or electronic devices, wireless transmitters described herein may transform a vicinity of the wireless transmitter (e.g. Wi-Fi router) into a wireless charging hotspot for devices such as FitBit and Jawbone activity trackers. For example, the wireless transmitter 105 of FIG. 1 may be provided with a shelf or other supporting surface to receive an electronic device for charging, such as a FitBit or other activity tracker.

Figure 4:
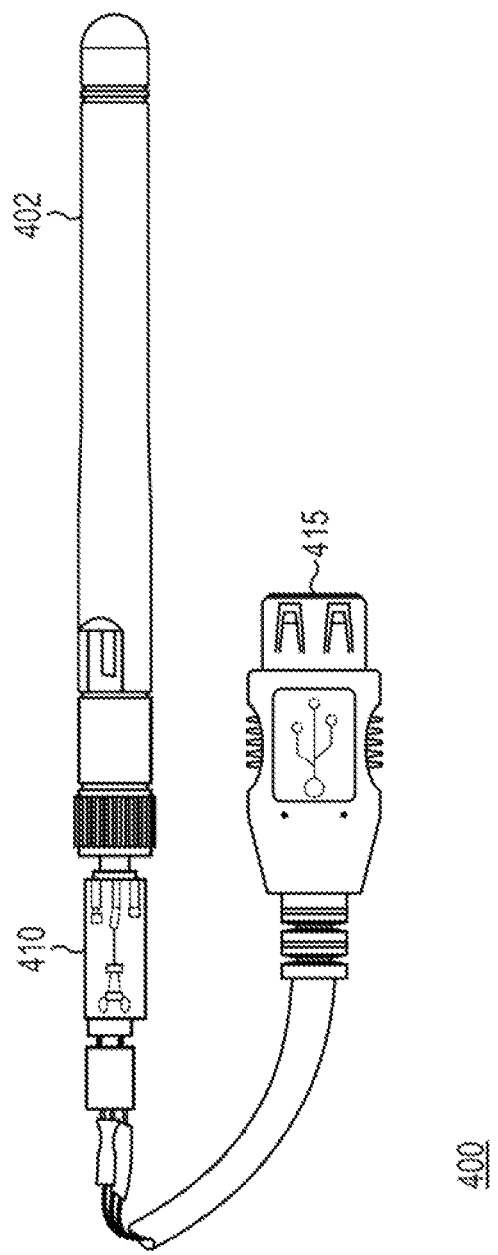
FIG. 4 is a schematic illustration of a charger arranged in accordance with examples described herein.

FIG. 4 is a schematic illustration of a charger arranged in accordance with examples described herein. The charger 400 includes an antenna 402, power harvesting circuitry 405, and electronic interface 410. The charger 400 may receive wireless communication signals configured for power transmission from a wireless transmitter described herein, such as the wireless transmitter 105 of FIG. 1. The power harvesting circuitry 405 may be implemented using any power harvesting circuitry described herein, such as the power harvesting circuitry 200 of FIG. 2 or the power harvesting circuitry 300 of FIG. 3.

The antenna 402 may be implemented using a 2 dBi Wi-Fi antenna in one example. The electronic interface 410 may be a USB connector. While the USB connector may be used to connect with an electronic device, it is to be understood that the power or other signals provided by the harvesting circuitry to the electronic interface 410 may not be arranged in accordance with a USB protocol. In particular, the wireless power transfer system may deliver less than the 2.5 W that is the maximum power level that standards-compliant USB ports are required deliver. Any USB connector may be used including, but not limited to, USB Type A, USB Type B, Mini-A, Mini-B, Micro-A, Micro-B, USB 3.0 Type A, USB 3.0 Type B, USB 3.0 Micro-B, and Type C. The electronic interface 410 may be connected to an electronic device (e.g. activity tracker such as a Jawbone UP24). The electronic device connected to the charger 400 may be placed within an appropriate distance of the Wireless transmitter, such as the wireless transmitter 105 configured for power transmission. In some examples, the harvesting circuitry 405 may be integrated with an antenna of a wearable device.

From the foregoing it will be appreciated that, although specific embodiments of the invention have been described herein for purposes of illustration, various modifications may be made without deviating from the spirit and scope of the invention.

What is claimed is:

1. A method comprising:
   detecting, at a wireless transmitter, wireless communication traffic is below a threshold traffic level; and
   when the wireless communication traffic is below the threshold level, transmitting power packets over multiple communication channels,
   wherein a number or data rate of the power packets is selected based at least in part on electrical characteristics of harvesting circuitry configured to harvest power from the power packets.

2. The method of claim 1 wherein detecting wireless communication traffic is below a threshold traffic level includes detecting, at the wireless transmitter, wireless communication traffic is below the threshold traffic level by accessing a number of packets in a queue of the wireless transmitter, and
   wherein the power packets are inserted in the queue when the number of packets in the queue is below the threshold level.

3. The method of claim 2 wherein the power packet comprises a UDP broadcast packet.

4. The method of claim 2 further comprising using the wireless transmitter to perform transmitting the power packets.

5. The method of claim 3 wherein the wireless transmitter is configured to transmit data signals using a first antenna and wherein the wireless transmitter is further configured to transmit the power packets using a second antenna.

6. The method of claim 2 further comprising using the wireless transmitter to transmit data signals and using another device to perform transmitting the power packets.

7. The method of claim 2 wherein the wireless transmitter is configured to transmit a Wi-Fi signal.

8. The method of claim 1 further comprising a control loop whereby the wireless transmitter selects the number or data rate of the power packets based at least in part on the electrical characteristics.

9. A device comprising:
   at least one antenna;
   a queue configured to store packets for data transmission from the at least one antenna in accordance with a wireless communication technique; and
   at least one computer readable media encoded with executable instructions that, when executed by at least one processing unit, cause the device to insert power packets in the queue when fewer than a threshold number of packets are stored in the queue for data transmission,
   wherein the threshold number is based, at least in part, on electrical characteristics of power harvesting circuitry configured to receive transmissions from the device.

10. The device of claim 9, wherein the power packets are configured for transmission on multiple communication channels.

11. The device of claim 10, wherein the multiple communication channels each correspond with different frequencies.

12. The device of claim 10, wherein the multiple communication channels are distinguished spatially using multiple antennas.

13. The device of claim 9, wherein the power packets comprise UDP broadcast packets.

14. The device of claim 9, wherein the data transmission comprises Wi-Fi data transmission.

* * * * *